March 24, 1964

S. A. YOUNG 3,126,212

COMBINATION GROUND JOINT AND SWEAT CONNECTION

Filed Nov. 9, 1960

INVENTOR.
S. A. YOUNG
BY
Robb & Robb
attorneys

United States Patent Office 3,126,212
Patented Mar. 24, 1964

3,126,212
COMBINATION GROUND JOINT AND SWEAT CONNECTION
Stephen A. Young, Flora, Ind.
Filed Nov. 9, 1960, Ser. No. 68,292
1 Claim. (Cl. 285—12)

This invention relates to plumbing fittings or fixtures, and particularly to the means for connecting the same to supply piping, both for permanent and separable conditions.

More specifically, the broad contemplation of this invention is to provide a construction which will facilitate the connecting of control valves to piping, of whatever type piping may be preferred, in several different ways so that all conditions possibly encountered will be provided for satisfactorily.

In valve connecting means for plumbing fittings or fixtures, it is customary to provide a ground joint connection, formed on the inlet section of the valve, involving the use of a ground joint nut with a ground joint coupling, the latter being equipped with suitable threads so as to receive a pipe therewithin. Under other conditions, the ground joint coupling may be replaced by a sweat coupling, which involves the provision of a smooth female bore to which the piping may be sweat connected in the usual manner.

In the instant invention, it it contemplated that virtually any combination of connections may be resorted to by the plumber or other person making the same, involving the provision of a sweat connection both in the valve and in the coupling, and of a threaded connection for usual ground joint connection, and either a permanent or separable sweat connection in accordance with the wishes of the person making the said connection.

It is therefore a specific object of this invention to provide novel valve structure involving the provision of both separable and permanent sweat connection, in combination with the usual ground joint coupling arrangement.

It is a further object of this invention to provide valve structure in which the inlet section is formed somewhat differently from that ordinarily contemplated, and adaption of the inlet section for connection with the usual ground joint coupling is provided by novel means which in turn make much more flexible the manner of connection as has previously been suggested.

Other and further objects of the invention will be understood from a consideration of the specification appended hereto and disclosed in the drawing wherein.

Figure 1:
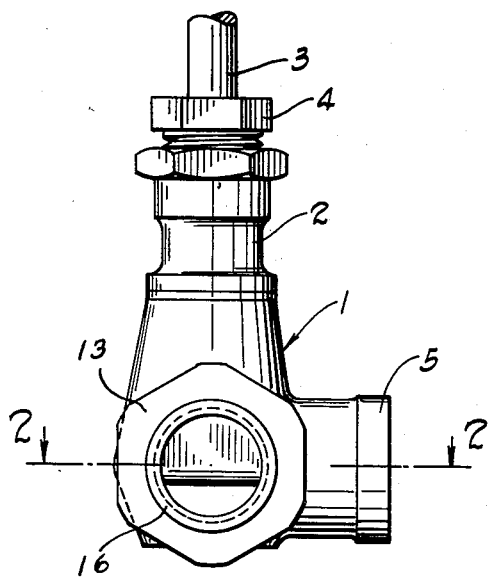
FIGURE 1 is an elevation view of a valve in which the novel means hereof are incorporated.

Referring now to FIGURE 1, a valve of generally conventional construction is disclosed as comprising a body 1, at the upper end of which is mounted a bonnet 2, the bonnet 2 having provision therein for the operation of a stem 3, with a suitable bushing 4 being threadedly engaged with the bonnet 2.

Figure 2:
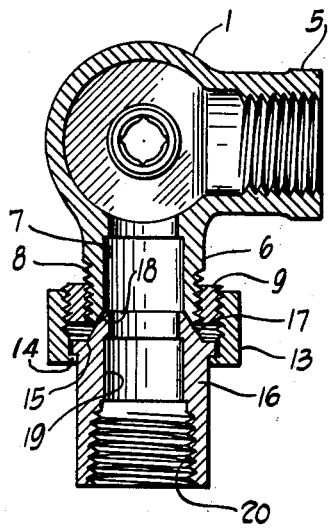
FIGURE 2 is a cross sectional view taken about on the line 2—2 of FIGURE 1 looking in the direction of the arrows.

The outlet section of the valve 1 is shown at 5, and the inlet section more particularly seen in FIGURE 2 is denoted 6.

In this particular instance, and as one of the novel features of this invention, the inlet section 6 is provided with a smooth bore 7, which is of a suitable diameter to provide for the sweat connection of tubing or piping thereto, and is denoted a female sweat connection formation.

Figure 3:
FIGURE 3 is a cross sectional view in elevation of the coupling adapter used in the coupling arrangement.

On the outer side or surface of the inlet section 6, male threads 8 are formed, so as to receive thereupon an adapter 9, in the form of a ring more particularly seen in detail in FIGURE 3, as having the threads 10 internally thereof for mating engagement with the threads 8 previously mentioned, and other threads 11 on the exterior surface. The adapter 9 is relatively short in extent but sufficiently long to have adequate threaded engagement and prevent any leakage between the threads 8 and 10 previously mentioned.

Figure 4:
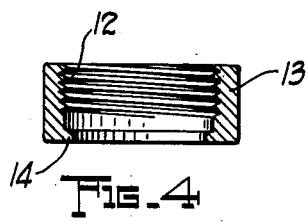
FIGURE 4 is a cross sectional view, in elevation, showing a ground joint coupling nut.
Figure 5:
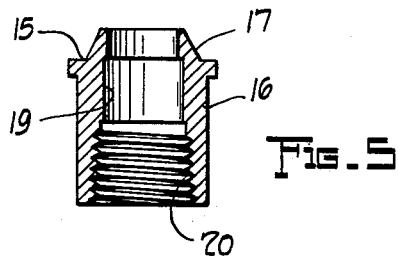
FIGURE 5 is a cross sectional view in elevation showing a ground joint coupling member formed in accordance with the objects hereof.

The threads 11, are the common threads to receive thereon the mating threads 12 as indicated in FIGURE 4 of a ground joint nut 13. The ground joint nut 13 is of generally special construction and is formed with a shoulder at 14 to engage with a corresponding shoulder 15 formed on a ground joint coupling 16, the latter being of somewhat conventional construction by reason of the shoulder formation 15 and the bevel section 17 thereon which mates with the corresponding bevel section 18 formed in the inlet section 6 previously described.

The ground joint coupling 16 is equipped with a female sweat connection formation 19, similar to the formation 7 previously mentioned and adapted to receive a pipe or tubing therein for sweat connection in accordance with its own technique.

The ground joint coupling 16 is further equipped with the tapered pipe threads such as 20 which in most instances are adapted to receive the mating threads of a half-inch iron pipe supply line or similar threads as will be readily appreciated.

In accordance with the structure just previously described, it will be seen that the construction disclosed, will provide many different combinations of connection, in accordance with any technique desired to be used by the plumber or other person installing the same.

For example without more, the inlet section 6, equipped with the sweat connection formation 7 can be permanently connected to the tubing or pipe by the usual sweat technique. In addition by mounting the ring 9 on the inlet section 6, and providing an ordinary ground joint coupling nut 13 and coupling therefor, iron pipe connection of the valve with the supply may be effected through threads such as those denoted 20. The sweat connection formation 19 is of course not ordinarily found in ground joint coupling members such as 16, and in this instance the provision of such a formation, facilitates the sweat connection of tubing or piping thereto so as to be separable by disassembly of the nut 13 in accordance with known technique.

In view of the foregoing it will be apparent that a very novel construction is provided making possible the connection of supply lines of different construction and different arrangement in accordance with the desires of the person installing the same whether permanently or in a condition for disconnection without substantial manipulation.

I claim:

In a plumbing fixture selectively fuseably and separably connectable to a supply conduit, the combination comprising, a conduit, said conduit including an externally tapered pipe threaded portion having a bore therethrough, an internally counterbored portion of a sufficient size to accommodate a sweat connection and an inwardly beveled mouth portion, a ground joint including a coupling having a substantially tubular body including an internally threaded portion at one end thereof, the opposite end terminating in a face beveled complementary to said mouth, a bore and a counterbore in said coupling, said counterbore having sufficient size to accommodate a sweat connection with a pipe of a capacity substantially equal to the capacity of a pipe threadedly connected to said externally threaded portion, means selectively interconnecting fuseably and separably said ground joint coupling and said conduit including an internally and externally threaded adapter selectively connectable with said externally tapered pipe threaded portion of said conduit, a ground joint nut selectively connectable with said adapter and a sweat joint fitting in the form of a counterbore of sufficient size to accommodate a sweat connection with a pipe of a capacity substantially equal to the capacity of a pipe connected to said internally threaded portion whereby said coupling may be selectively fuseably and separably attached to said conduit.

References Cited in the file of this patent
UNITED STATES PATENTS

| | | |
|---|---|---|
| 2,159,811 | Leonardo | Mar. 18, 1938 |
| 2,709,606 | Mueller et al. | May 31, 1955 |

FOREIGN PATENTS

| | | |
|---|---|---|
| 721,160 | France | Dec. 12, 1931 |